United States Patent
Nishida et al.

(10) Patent No.: US 10,371,421 B2
(45) Date of Patent: Aug. 6, 2019

(54) HEAT PUMP-TYPE HEATING DEVICE

(71) Applicant: DAIKIN INDUSTRIES, LTD., Osaka-Shi, Osaka (JP)

(72) Inventors: Teruo Nishida, Osaka (JP); Shinji Yoshikawa, Osaka (JP); Yukio Matsusaka, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 15/768,368

(22) PCT Filed: Oct. 17, 2016

(86) PCT No.: PCT/JP2016/080640
§ 371 (c)(1),
(2) Date: Apr. 13, 2018

(87) PCT Pub. No.: WO2017/065309
PCT Pub. Date: Apr. 20, 2017

(65) Prior Publication Data
US 2018/0313586 A1 Nov. 1, 2018

(30) Foreign Application Priority Data
Oct. 16, 2015 (JP) .................................. 2015-205058

(51) Int. Cl.
*F24H 4/02* (2006.01)
*F25B 1/00* (2006.01)
(Continued)

(52) U.S. Cl.
CPC .............. *F25B 30/02* (2013.01); *F24F 11/89* (2018.01); *F24H 4/02* (2013.01); *F25B 1/00* (2013.01);
(Continued)

(58) Field of Classification Search
CPC .. F24D 17/02; F24F 11/89; F24H 4/02; F25B 1/00; F25B 13/00; F25B 2313/02334;
(Continued)

(56) References Cited

U.S. PATENT DOCUMENTS

| 9,068,766 B2* | 6/2015 | Tamaki ................... F24D 17/02 |
| 2013/0019624 A1 | 1/2013 | Tamaki et al. |
| 2016/0116191 A1 | 4/2016 | Tamaki et al. |

FOREIGN PATENT DOCUMENTS

| JP | 719617 A | 1/1995 |
| JP | 8-327165 A | 12/1996 |

(Continued)

OTHER PUBLICATIONS

International Search Report (PCT/ISA/210) issued in PCT/JP2016/080640, dated Jan. 10, 2017.

*Primary Examiner* — Edward F Landrum
*Assistant Examiner* — Chang H. Park
(74) *Attorney, Agent, or Firm* — Birch, Stewart, Kolasch & Birch, LLP (57) ABSTRACT

The oil level in a compressor is lowered upon activation of the compressor. A heat pump-type heating device of the present invention includes: a refrigerant circuit in which a compressor, a heat-source-side heat exchanger, a motor-operated valve, and a target-side heat exchanger are provided; and an outdoor fan which is provided for the heat-source-side heat exchanger. The target-side heat exchanger is capable of heating, by a refrigerant, fluid supplied from outside. The rotation number of the outdoor fan upon activation of the compressor when a difference between a temperature of the fluid supplied to the target-side heat exchanger and an outside temperature is equal to or larger than a predetermined temperature difference is smaller than (Continued)

the rotation number when the difference is smaller than the predetermined temperature difference.

4 Claims, 6 Drawing Sheets

(51) Int. Cl.
  *F24F 11/89* (2018.01)
  *F25B 13/00* (2006.01)
  *F25B 30/02* (2006.01)
  *F25B 49/02* (2006.01)
(52) U.S. Cl.
  CPC ............ F25B 13/00 (2013.01); F25B 49/025 (2013.01); *F25B 2600/112* (2013.01); *F25B 2700/2103* (2013.01); *F25B 2700/2106* (2013.01); *Y02B 30/12* (2013.01)
(58) Field of Classification Search
  CPC ...... F25B 2313/0314; F25B 2313/0315; F25B 2400/05; F25B 2600/112; F25B 2700/2103; F25B 2700/2106; F25B 2700/21152; F25B 2700/2116; F25B 2700/2117; F25B 29/00; F25B 30/02; F25B 31/002; F25B 41/00; F25B 49/025; F25B 6/02
  See application file for complete search history.

(56) References Cited

FOREIGN PATENT DOCUMENTS

| | | |
|---|---|---|
| JP | 2002-310520 A | 10/2002 |
| JP | 2009-139014 A | 6/2009 |
| JP | 2011-196647 A | 10/2011 |
| JP | 2012-21744 A | 2/2012 |
| JP | 2014-145572 A | 8/2014 |
| JP | 2014-222145 A | 11/2014 |
| JP | 5712196 B2 | 5/2015 |
| WO | 2011/125111 A1 | 10/2011 |
| WO | WO 2014/188575 A1 | 11/2014 |

* cited by examiner

HEAT PUMP-TYPE HEATING DEVICE

TECHNICAL FIELD

The present invention relates to a heat pump-type heating device including members such as a heating-purpose heat exchanger.

BACKGROUND ART

There is a known heat pump type heater including a heat pump unit and a heating circuit in which hot water heated by the heat pump unit flows. In this heat pump type heater, the heat pump unit includes a heating-purpose heat exchanger which is configured to heat the hot water flowing in the heating circuit. With this, in the heating-purpose heat exchanger, the hot water flowing in the heating circuit is heated by a refrigerant discharged from a compressor of the heat pump unit.

CITATION LIST

Patent Literature

[Patent Literature 1] Japanese Patent No. 5712196

SUMMARY OF INVENTION

Technical Problem

In the heat pump type heater of Patent Literature 1, when the inflow water temperature of the hot water flowing into the heating-purpose heat exchanger is high upon activation of the compressor, the refrigerant is disadvantageously condensed in a dome of the compressor, with the result that oil in the compressor tends to be discharged together with the refrigerant and the oil level in the compressor is lowered.

The present invention has been done to solve this problem, and an object of the invention is to provide a heat pump-type heating device in which lowering of the oil level in a compressor is prevented.

Solution to Problem

According to the first aspect of the invention, a heat pump-type heating device includes: a refrigerant circuit in which a compressor, a heat-source-side heat exchanger, a motor-operated valve, and a target-side heat exchanger are provided; and an outdoor fan which is provided for the heat-source-side heat exchanger, the target-side heat exchanger being capable of heating, by a refrigerant, fluid supplied from outside, and under rotation number reduction control which is carried out when a difference between a temperature of the fluid supplied to the target-side heat exchanger and an outside temperature is equal to or larger than a predetermined temperature difference, the rotation number of the outdoor fan upon activation of the compressor being smaller than when the difference is smaller than the predetermined temperature difference.

In this heat pump-type heating device, because the rotation number of the outdoor fan upon activation of the compressor is controlled to be small when the difference between the temperature of the fluid supplied to the target-side heat exchanger and the outside temperature is equal to or larger than the predetermined temperature difference, condensation of refrigerant in the dome of the compressor is restrained. It is therefore possible to prevent the oil level in the compressor from being lowered upon activation of the compressor.

According to the second aspect of the invention, the heat pump-type heating device of the first aspect is arranged such that the rotation number reduction control of reducing the rotation number of the outdoor fan upon activation of the compressor is carried out when a discharge temperature of the compressor is equal to or lower than a predetermined temperature.

In this heat pump-type heating device, the rotation number reduction control is carried out only when the discharge temperature of the compressor is equal to or lower than the predetermined temperature. It is therefore possible to prevent the rotation number of the outdoor fan from being decreased when the refrigerant is not condensed in the dome of the compressor upon activation of the compressor.

According to the third aspect of the invention, the heat pump-type heating device of the first or second aspect is arranged such that the rotation number reduction control of reducing the rotation number of the outdoor fan upon activation of the compressor is terminated when a discharge temperature of the compressor is higher than a temperature of the target-side heat exchanger.

In this heat pump-type heating device, the rotation number reduction control can be terminated when the discharge temperature of the compressor becomes higher than the temperature of the target-side heat exchanger and the refrigerant is no longer condensed in the dome of the compressor.

According to the fourth aspect of the invention, the heat pump-type heating device of any one of the first to third aspects is arranged such that the rotation number reduction control of reducing the rotation number of the outdoor fan upon activation of the compressor is terminated when a temperature of the heat-source-side heat exchanger is lower than the outside temperature.

In this heat pump-type heating device, the rotation number reduction control can be terminated when the temperature of the heat-source-side heat exchanger becomes lower than the outside temperature and the refrigerant is no longer condensed in the dome of the compressor.

Advantageous Effects of Invention

According to the first aspect of the invention, because the rotation number of the outdoor fan upon activation of the compressor is controlled to be small when the difference between the temperature of the fluid supplied to the target-side heat exchanger and the outside temperature is equal to or larger than the predetermined temperature difference, condensation of refrigerant in the dome of the compressor is restrained. It is therefore possible to prevent the oil level in the compressor from being lowered upon activation of the compressor.

According to the second aspect of the invention, the rotation number reduction control is carried out only when the discharge temperature of the compressor is equal to or lower than the predetermined temperature. It is therefore possible to prevent the rotation number of the outdoor fan from being decreased when the refrigerant is not condensed in the dome of the compressor upon activation of the compressor.

According to the third aspect of the invention, the rotation number reduction control can be terminated when the discharge temperature of the compressor becomes higher than the temperature of the target-side heat exchanger and the refrigerant is no longer condensed in the dome of the compressor.

According to the fourth aspect of the invention, the rotation number reduction control can be terminated when the temperature of the heat-source-side heat exchanger becomes lower than the outside temperature and the refrigerant is no longer condensed in the dome of the compressor.

DESCRIPTION OF EMBODIMENTS

The following describes an embodiment of the present invention with reference to attached drawings.

Figure 1:
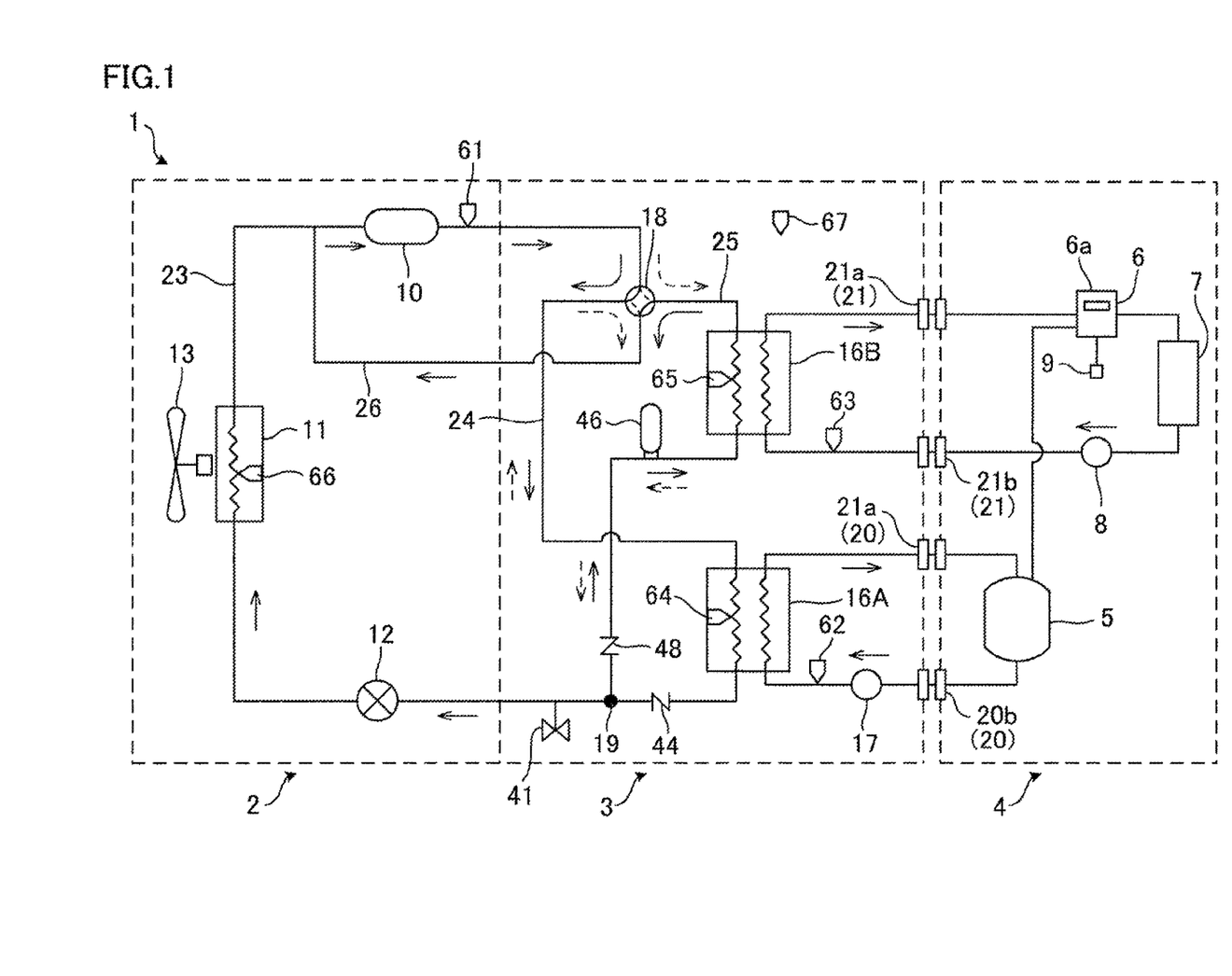
FIG. 1 is block diagram showing a heat pump-type heating device of an embodiment of the present invention.
Figure 2:
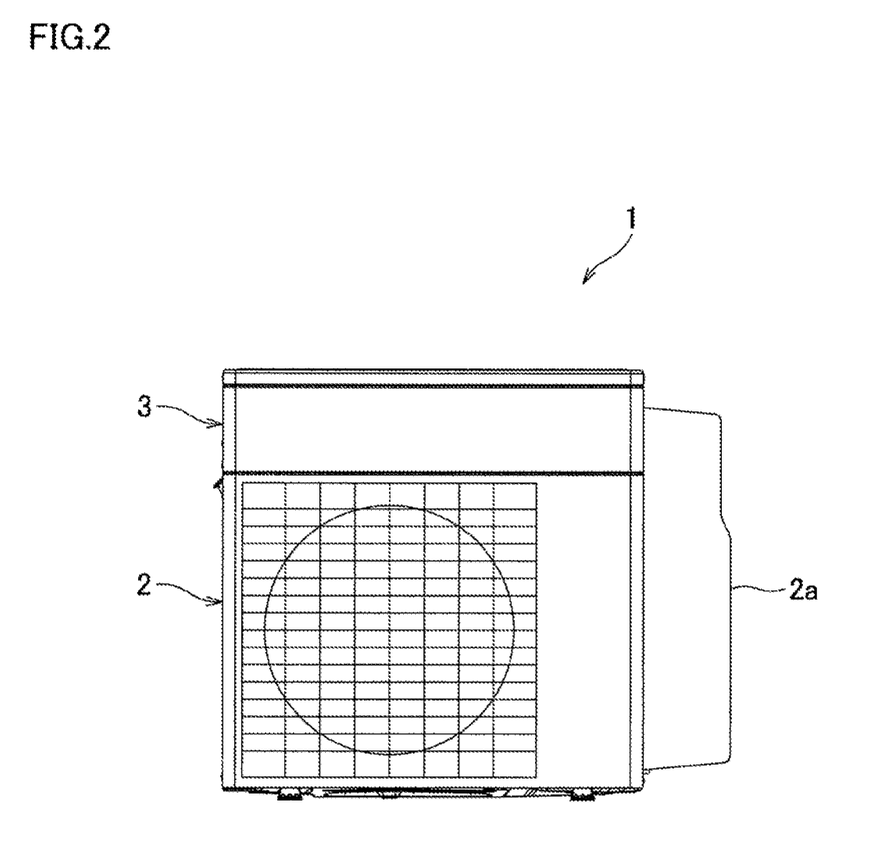
FIG. 2 is a front view of an outdoor unit included in the heat pump-type heating device shown in FIG. 1.

A heat pump-type heating device (outdoor unit) 1 includes a heat pump unit 2 and a water unit 3 provided above the heat pump unit 2, as shown in FIG. 1 and FIG. 2. The heat pump unit houses a compressor 10, an outdoor heat exchanger (heat-source-side heat exchanger) 11, a motor-operated valve 12, and an outdoor fan 13. The water unit 3 houses a hot water supply heat exchanger (target-side heat exchanger) 16A, a heating-purpose heat exchanger (target-side heat exchanger) 16B, and a water supply pump 17.

Inside the outdoor unit 1, a refrigerant circuit (heat pump) in which a refrigerant circulates is constructed. This refrigerant circuit includes a main passage 23, a first passage 24, a second passage 25, and a low-pressure passage 26. On the main passage 23, the compressor 10, the outdoor heat exchanger 11, and the motor-operated valve 12 are provided in order. To the discharging end of the compressor 10 which is arranged on the passage connected to one end of the outdoor heat exchanger 11, a four-pass switching valve 18 is connected.

The first passage 24 and the second passage 25 are branched from the four-pass switching valve 18 arranged on the passage connected to the discharging end of the compressor 10, and are merged at a merging point 19 which is on a passage connected to the other end of the outdoor heat exchanger 11. Between the merging point 19 and the motor-operated valve 12 on the main passage 23, a service port 41 is provided to communicate with the refrigerant circuit. The service port 41 is used for, for example, pouring a refrigerant into the refrigerant circuit from the outside at a maintenance time, or discharging the refrigerant from the refrigerant circuit to the outside.

In a heating operation, the first passage 24 connects the four-pass switching valve 18 provided downstream of the compressor 10 on the main passage 23 to the merging point 19 provided upstream of the motor-operated valve 12. On the first passage 24, the hot water supply heat exchanger 16A and a first check valve 44 are provided. The first check valve 44 is provided between the hot water supply heat exchanger 16A and the merging point 19. The first check valve 44 allows the refrigerant to flow from the hot water supply heat exchanger 16A to the merging point 19 but prevents the refrigerant from flowing from the merging point 19 to the hot water supply heat exchanger 16A (first passage 24).

The second passage 25 connects the four-pass switching valve 18 and the merging point 19 to the first passage 24 in a parallel manner. On the second passage 25, the heating-purpose heat exchanger 16B, a receiver 46, and a second check valve 48 are provided. The second check valve 48 allows the refrigerant to flow from the heating-purpose heat exchanger 16B to the merging point 19 but prevents the refrigerant from flowing from the merging point 19 to the heating-purpose heat exchanger 16B (second passage 25).

The receiver 46 is a container storing the refrigerant, and is provided between the heating-purpose heat exchanger 16B and the second check valve 48 of the second passage 25 which is smaller in refrigerant capacity than the first passage 24. The second check valve 48 is provided between the heating-purpose heat exchanger 16B and the merging point 19 (i.e., downstream of the heating-purpose heat exchanger 16B and upstream of the merging point 19).

The low-pressure passage 26 connects the four-pass switching valve 18 to the sucking side of the compressor 10. While the sucking side of the compressor 10 indicates a part between the motor-operated valve 12 and the compressor 10, the low-pressure passage 26 is specifically connected to a part between the compressor 10 and the outdoor heat exchanger 11.

The water supply pump 17 supplies hot water for hot-water-supply (hereinafter, supply-purpose hot water) flowing out from a hot water supply tank 5 to the hot water supply heat exchanger 16A, and circulates the supply-purpose hot water to the hot water supply tank 5.

The heat pump-type heating device 1 includes a discharge temperature sensor 61 configured to detect a discharge temperature of the compressor 10, a hot-water-supply inflow water temperature sensor 62 configured to detect an inflow water temperature of the hot water supply heat exchanger (target-side heat exchanger) 16A, a heating inflow water temperature sensor 63 configured to detect an inflow water temperature of the heating-purpose heat exchanger (target-side heat exchanger) 16B, a hot-water-supply heat-exchange temperature sensor 64 configured to detect a condensation temperature of the hot water supply heat exchanger (target-side heat exchanger) 16A, a heating heat-exchange temperature sensor 65 configured to detect a condensation temperature of the heating-purpose heat exchanger (target-side heat exchanger) 16B, an outdoor heat-exchange temperature sensor 66 configured to detect a temperature of the outdoor heat exchanger 11, and an outside temperature sensor 67 configured to detect the outside temperature.

The above-described refrigerant circuit is switched between a first state and a second state which are described later by the four-pass switching valve 18 so that the refrigerant discharged from the compressor 10 flows in one of the first passage 24 and the second passage 25 and does not flow in the other one of them.

In the first state, the refrigerant discharged from the compressor 10 flows in the first passage 24 but does not flow in the second passage 25, and the second passage 25 is connected to the low pressure side of the main passage 23. To be more specific, in regard to the hot water supply heat exchanger 16A in which the refrigerant flows, a refrigerant inflow port of the first passage 24 is connected to the discharging end of the compressor 10 via the four-pass switching valve 18, and a refrigerant outflow port of the first passage 24 is connected to the motor-operated valve 12. One end of the second passage 25 in which the refrigerant does not flow is connected to the low-pressure passage 26 via the four-pass switching valve 18, whereas the other end is connected to the merging point 19.

In the first state, as indicated by a solid line in FIG. 1, the refrigerant discharged from the compressor 10 flows into the first passage 24 via the four-pass switching valve 18. After a heat exchange with water at the hot water supply heat exchanger 16A, the refrigerant reaches the motor-operated valve 12 via the merging point 19. Meanwhile, the refrigerant in the second passage 25 flows into the low-pressure passage 26 via the four-pass switching valve 18 and is sucked into the compressor 10. After the refrigerant in the second passage 25 is sucked into the compressor 10, however, the refrigerant between the merging point 19 and the second check valve 48 is not sucked further into the compressor 10 on account of the presence of the second check valve 48.

In the second state, the refrigerant discharged from the compressor 10 flows in the second passage 25 and does not flow in the first passage 24, and the first passage 24 is connected to the low pressure side of the main passage 23. To be more specific, in regard to the heating-purpose heat exchanger 16B in which the refrigerant flows, a refrigerant inflow port of the second passage 25 is connected to the discharging end of the compressor 10 via the four-pass switching valve 18, and a refrigerant outflow port of the second passage 25 is connected to the motor-operated valve 12. One end of the first passage 24 in which the refrigerant does not flow is connected to the low-pressure passage 26 via the four-pass switching valve 18, whereas the other end is connected to the merging point 19.

In the second state, as indicated by a dotted line in FIG. 1, the refrigerant discharged from the compressor 10 flows into the second passage 25 via the four-pass switching valve 18. After heat exchange with water in the heating-purpose heat exchanger 16B, the refrigerant reaches the motor-operated valve 12 via the merging point 19. Meanwhile, the refrigerant in the first passage 24 flows into the low-pressure passage 26 via the four-pass switching valve 18 and is sucked into the compressor 10. After the refrigerant in the first passage 24 is sucked into the compressor 10, however, the refrigerant between the merging point 19 and the first check valve 44 is not further sucked into the compressor 10 on account of the presence of the first check valve 44.

The water unit 3 includes a hot water supply pipe connector 20 and a heating water supply pipe connector 21. The hot water supply pipe connector 20 includes a feed connector 20a and a return connector 20b, whereas the heating water supply pipe connector 21 includes a feed connector 21a and a return connector 21b.

In the water unit 3, in the first state, the feed connector 20a of the hot water supply pipe connector 20 is connected to a water outflow port of the hot water supply heat exchanger 16A, whereas the return connector 20b of the hot water supply pipe connector 20 is connected to a water inflow port of the hot water supply heat exchanger 16A. As the hot water supply heat exchanger 16A, the hot water supply tank 5, and the hot water supply pump 17 are connected to one another, a hot water supply circuit is constructed.

In the first state, on account of heat exchange at the hot water supply heat exchanger 16A between the refrigerant flowing from the four-pass switching valve 18 on the passage connected to the discharging end of the compressor 10 and the supply-purpose hot water flowing from the return connector 20b of the hot water supply pipe connector 20, the supply-purpose hot water is heated, and the heated supply-purpose hot water flows out toward the feed connector 20a of the hot water supply pipe connector 20.

In the water unit 3, in the second state, the feed connector 21a of the heating water supply pipe connector 21 is connected to a water outflow port of the heating-purpose heat exchanger 16B, whereas the return connector 21b of the heating water supply pipe connector 21 is connected to a water inflow port of the heating-purpose heat exchanger 16B. As the heating-purpose heat exchanger 16B, a gas boiler 6, a heating terminal 7, and a pump 8 are connected to one another, a heating circuit is constructed.

In the second state, on account of heat exchange at the heating-purpose heat exchanger 16B between the refrigerant flowing from the four-pass switching valve 18 on the passage connected to the discharging end of the compressor 10 and hot water for heating (hereinafter, heating-purpose hot water) flowing from the return connector 21b of the heating water supply pipe connector 21, the heating-purpose hot water is heated and the heated heating-purpose hot water flows out toward the feed connector 21a of the heating water supply pipe connector 21. In the heat pump-type heating device of the present embodiment, the outdoor unit 1 is able to heat one of the supply-purpose hot water and the heating-purpose hot water.

The heat pump-type heating device 1 of the present embodiment is connected to a target-side apparatus 4. The target-side apparatus 4 includes the hot water supply tank 5, the gas boiler 6, the heating terminal 7 such as a floor heating panel, and the pump 8. The gas boiler 6 includes a heater 6a and is connected to the heating terminal 7 and a hot water supply terminal 9. The gas boiler 6 is therefore able to heat the supply-purpose hot water supplied from the hot water supply tank 5 before this water is supplied to the hot water supply terminal 9, and to heat the heating-purpose hot water supplied from the outdoor unit 1 before this water is supplied to the heating terminal 7. The pump 8 is configured to supply the heating-purpose hot water flowing out from the heating terminal 7 to the heating-purpose heat exchanger 16B and circulate the heating-purpose heat exchanger supplied to the heating terminal 7.

Figure 3A:
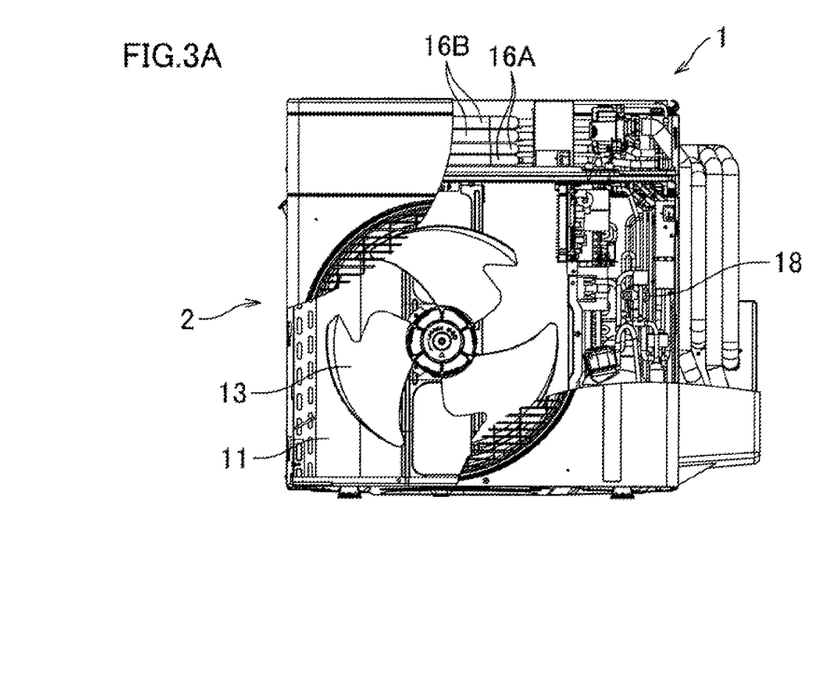
FIG. 3A is a partially broken view illustrating the internal structure of a heat pump unit and a water unit when the outdoor unit is viewed from the front.
Figure 3B:
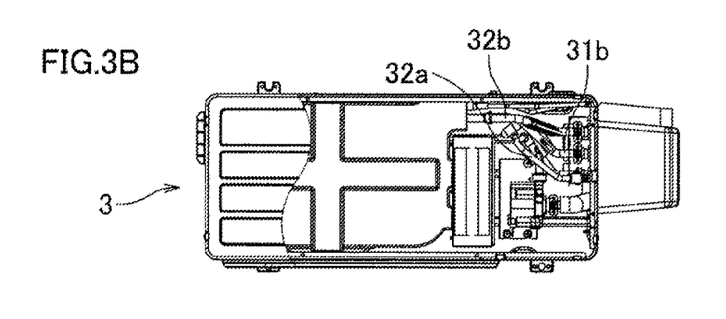
FIG. 3B is a partially broken view illustrating the internal structure of the water unit when the outdoor unit is viewed from above.
Figure 3C:
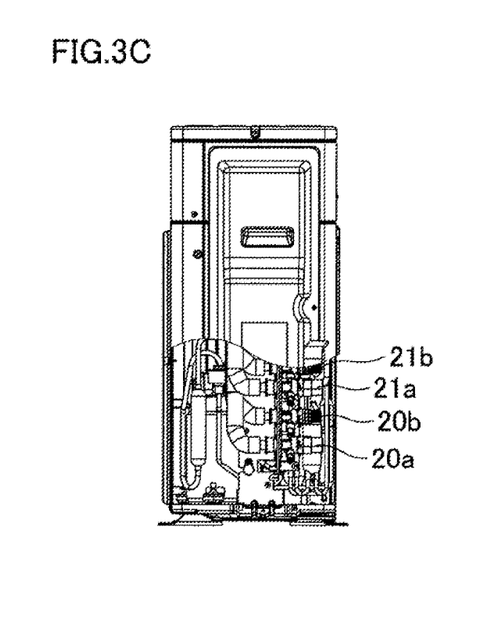
FIG. 3C is a partially broken view illustrating the layout of a hot water supply pipe connector and a heating water supply pipe connector when the right side face of the outdoor unit is viewed.

FIG. 3A is a partially broken view illustrating the internal structure of the heat pump unit 2 and the water unit 3 when the outdoor unit 1 is viewed from the front. FIG. 3B is a partially broken view illustrating the internal structure of the water unit 3 when the outdoor unit 1 is viewed from above. FIG. 3C is a partially broken view illustrating the layout of the hot water supply pipe connector 20 and the heating water supply pipe connector 21 when the right side face of the outdoor unit 1 is viewed. As shown in FIG. 3A, the four-pass switching valve 18 is provided in the heat pump unit 2.

Figure 4A:
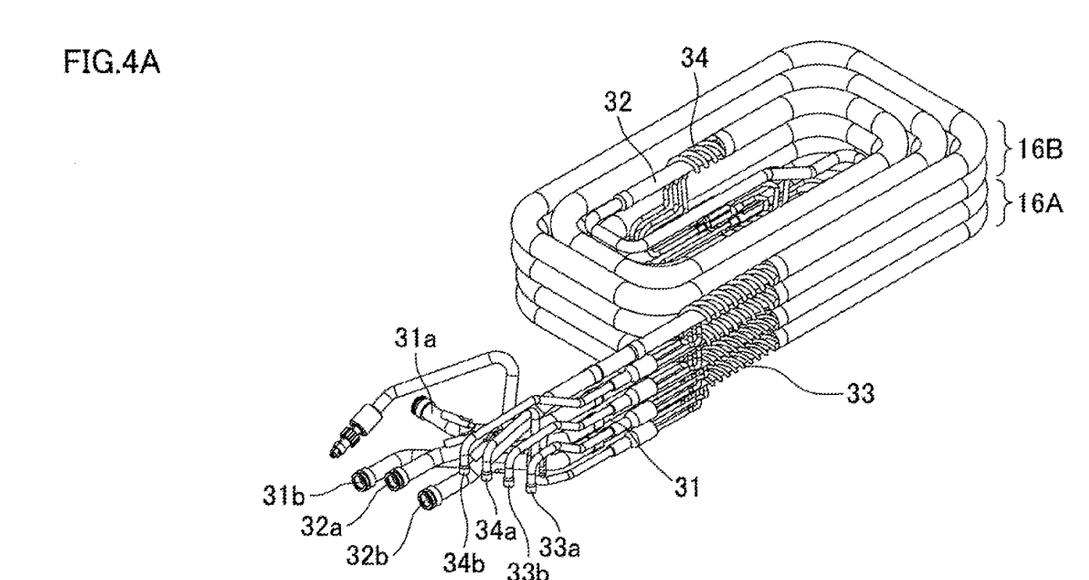
FIG. 4A and FIG. 4B are a perspective view and a side view of a hot water supply heat exchanger and a heating-purpose heat exchanger.
Figure 4B:
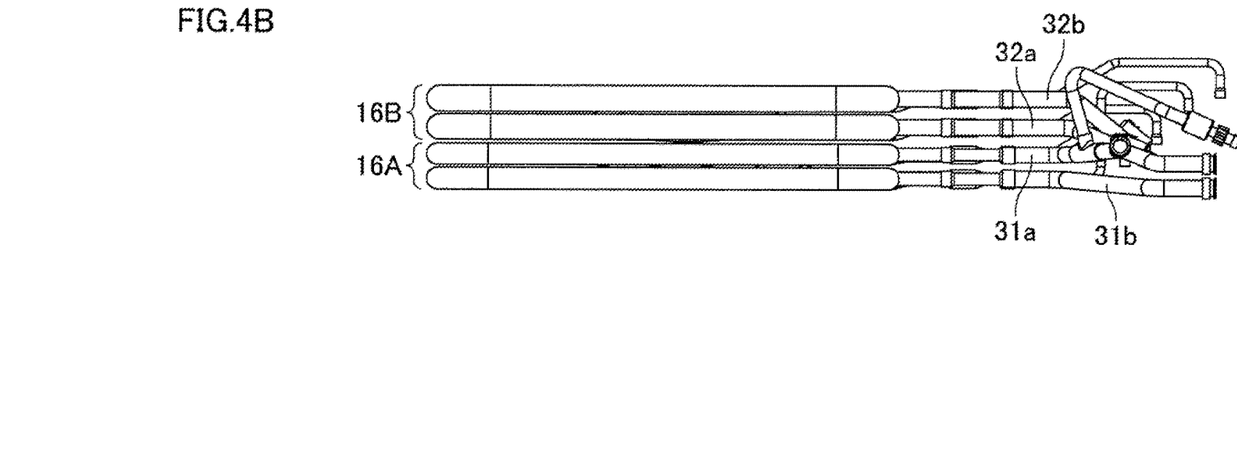

FIG. 4A and FIG. 4B are a perspective view and a side view of the hot water supply heat exchanger 16A and the heating-purpose heat exchanger 16B. Inside the water unit 3 of the outdoor unit 1, the hot water supply heat exchanger 16A and the heating-purpose heat exchanger 16B are stacked on each other in the up-down direction as shown in FIG. 4A.

The heating-purpose heat exchanger 16B includes the heating water pipe 32 which is wound to form two stages in the up-down direction, whereas the hot water supply heat exchanger 16A includes the hot water supply pipe 31 which is wound to form two stages in the up-down direction. In plan view, each stage of the hot water supply pipe 31 and the heating water pipe 32 is wound in a substantially spiral manner.

The water inflow port of the hot water supply heat exchanger 16A is connected to a hot water supply return connection pipe 31a which extends from the water supply pump 17 (the return connector 20b of the hot water supply pipe connector 20), whereas the water outflow port of the hot water supply heat exchanger 16A is connected to a hot water supply feed connection pipe 31b which extends from the feed connector 20a of the hot water supply pipe connector 20. The water inflow port of the heating-purpose heat exchanger 16B is connected to a heating return connection pipe 32a which extends from the return connector 21b of the heating water supply pipe connector 21, whereas the water outflow port of the heating-purpose heat exchanger 16B is connected to a heating feed connection pipe 32b which extends from the feed connector 21a of the heating water supply pipe connector 21.

At the hot water supply heat exchanger 16A, a hot water supply refrigerant pipe 33 is provided in a spiral manner on the outer circumference of a hot water supply pipe 31. At the heating-purpose heat exchanger 16B, a heating refrigerant pipe 34 is provided in a spiral manner on the outer circumference of a heating water pipe 32. The refrigerant inflow port of the hot water supply heat exchanger 16A is connected to a hot water supply connection pipe 33a which extends from a branching point 18 on the passage connected to the discharging end of the compressor 10, whereas the refrigerant outflow port of the hot water supply heat exchanger 16A is connected to a hot water supply connection pipe 33b which extends from the motor-operated valve 12. The refrigerant inflow port of the heating-purpose heat exchanger 16B is connected to a heating connection pipe 34a which extends from the branching point 18 on the passage connected to the discharging end of the compressor 10, whereas the refrigerant outflow port of the heating-purpose heat exchanger 16B is connected to a heating connection pipe 34b which extends from the motor-operated valve 12.

In the present embodiment, the hot water supply heat exchanger 16A is a part where the hot water supply refrigerant pipe 33 is provided in a spiral manner on the outer circumference of a hot water supply pipe 31, whereas the heating-purpose heat exchanger 16B is a part where the heating refrigerant pipe 34 is provided in a spiral manner on the outer circumference of a heating water pipe 32.

The hot water supply pipe 31 of the hot water supply heat exchanger 16A is wound to form two stages in the up-down direction, and is arranged in such a way that the supply-purpose hot water flows from the hot water supply return connection pipe 31a into a part of the pipe which is on the lower stage, and the supply-purpose hot water flows out from a part of the pipe which is on the upper stage to the hot water supply feed connection pipe 31b. The heating water pipe 32 of the heating-purpose heat exchanger 16B is wound to form two stages in the up-down direction, and is arranged in such a way that the heating-purpose hot water flows from the heating return connection pipe 32a into a part of the pipe which is on the lower stage, and the heating-purpose hot water flows out from a part of the pipe which is on the upper stage to the heating feed connection pipe 32b.

The hot water supply pipe 31 of the hot water supply heat exchanger 16A and the heating water pipe 32 of the heating-purpose heat exchanger 16B, which are structured as above, are stacked on each other inside the water unit 3. To be more specific, the hot water supply heat exchanger 16A is wound to form two stages and the supply-purpose hot water flows out from a part of the pipe (i.e., the outer pipe) on the uppermost stage, whereas the heating-purpose heat exchanger 16B is stacked above the hot water supply heat exchanger 16A (i.e., the heating-purpose heat exchanger 16B is stacked on the hot water supply heat exchanger 16A to be close to the part of the pipe (i.e., the outer pipe) on the uppermost stage in the hot water supply pipe 31).

The hot water supply heat exchanger 16A is connected to water connection pipes (the hot water supply return connection pipe 31a and the hot water supply feed connection pipe 31b) and refrigerant connection pipes (the hot water supply connection pipe 33a and the hot water supply connection pipe 33b), whereas the heating-purpose heat exchanger 16B is connected to water connection pipes (the heating return connection pipe 32a and the heating feed connection pipe 32b) and refrigerant connection pipes (the heating connection pipe 34a and the heating connection pipe 34b).

Figure 5:
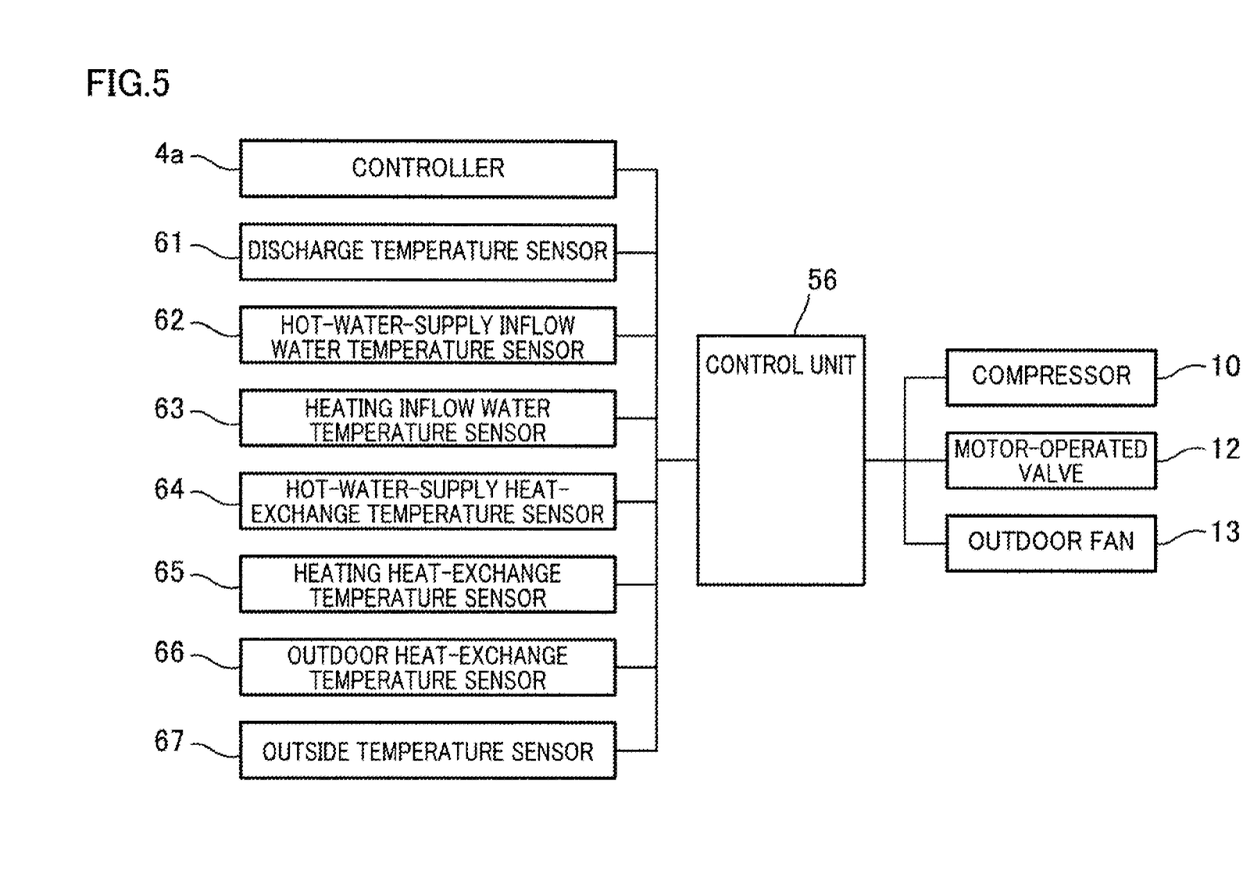
FIG. 5 is a block diagram of a controlling unit of the heat pump-type heating device shown in FIG. 1.

As shown in FIG. 5, a control unit 56 of the heat pump-type heating device 1 is connected to the compressor 10, the motor-operated valve 12, the outdoor fan 13, a controller 4a of the target-side apparatus 4, the discharge temperature sensor 61, the hot-water-supply inflow water temperature sensor 62, the heating inflow water temperature sensor 63, the hot-water-supply heat-exchange temperature sensor 64, the heating heat-exchange temperature sensor 65, the outdoor heat-exchange temperature sensor 66, and the outside temperature sensor 67.

The compressor 10 is controlled to be at a driving frequency based on the load of the hot water supply heat exchanger 16A or the heating-purpose heat exchanger 16B. The driving frequency is controlled to be equal to or higher than the minimum driving frequency except when the compressor 10 is stopped. The motor-operated valve 12 is controlled to have an opening degree which is equal to or larger than the minimum opening degree of the motor-operated valve 12 and is equal to or smaller than the maximum opening degree, when the compressor 10 is controlled to be at a driving frequency which is based on the load of the hot water supply heat exchanger 16A or the heating-purpose heat exchanger 16B. The outdoor fan 13 under normal control is controlled to be at a rotation number which is based on the outside temperature and the compressor frequency. Under rotation number reduction control, the outdoor fan 13 is in a stopped state irrespective of the outside temperature and the compressor frequency.

The controller 4a is a controller of the target-side apparatus 4. An instruction to start driving and an instructing to stop driving of the heating terminal 7 and/or the hot water supply terminal 9 are made through this controller. When an instruction to start or stop driving is made to the controller 4a, the instruction is transferred to the control unit 56.

Figure 6:
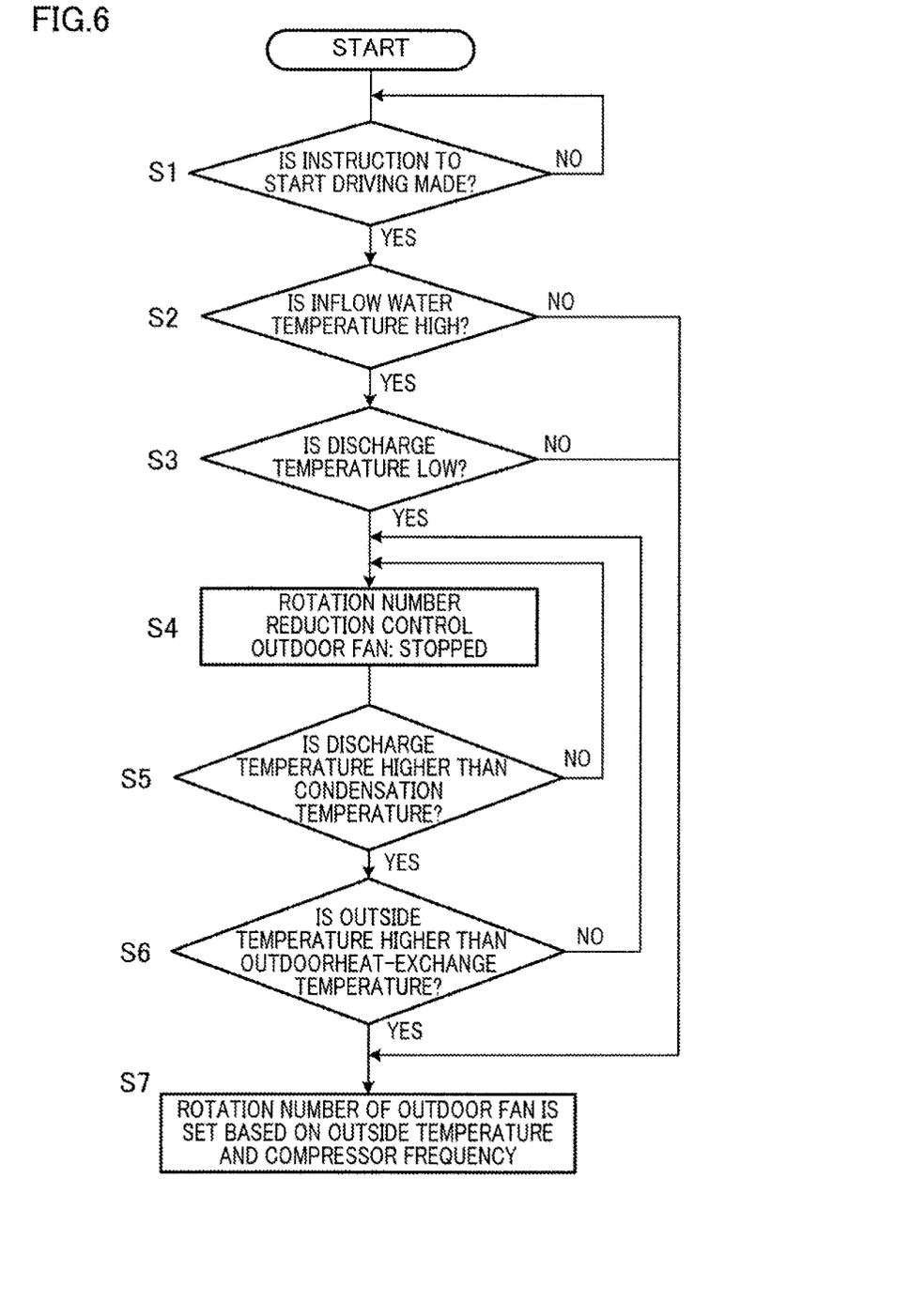
FIG. 6 is a flowchart of a drive stop operation of the heat pump-type heating device shown in FIG. 1.

The following will detail a driving start process of the heat pump-type heating device 1 of the present embodiment. FIG. 6 is a flowchart of the driving start process of the heat pump-type heating device. Particularly, the flowchart in FIG. 6 illustrates an algorithm which the control unit 56 is programmed to carry out.

In the step S1, the control unit 56 determines whether an instruction to start driving has been made, based on whether an instruction to start driving of the heating terminal 7 or the hot water supply terminal 9 has been made to the controller 4a. When an instruction to start driving has been made in the step S1, the process proceeds to the step S2 and whether a difference between the outside temperature and the inflow water temperature of the hot water supply heat exchanger 16A or the heating-purpose heat exchanger 16B is not smaller than a predetermined temperature difference is determined.

In the step S2, when the first state is set, the refrigerant discharged from the compressor 10 flows into the first passage 24 via the four-pass switching valve 18. On this account, whether a difference between the inflow water temperature of the hot water supply heat exchanger 16A and the outside temperature is not smaller than the predetermined temperature difference is determined. Meanwhile, when the second state is set, whether a difference between the inflow water temperature of the hot water supply heat exchanger 16B and the outside temperature is not smaller than the predetermined temperature difference is determined, because the refrigerant discharged from the compressor 10 flows into the second passage 25 via the four-pass switching valve 18.

When in the step S2 the difference between the outside temperature and the inflow water temperature of the hot water supply heat exchanger 16A or the heating-purpose heat exchanger 16B is not smaller than the predetermined temperature difference, the process proceeds to the step S3 and whether the discharge temperature of the compressor 10 is not higher than a predetermined temperature is determined. When in the step S3 the discharge temperature of the compressor 10 is equal to or lower than the predetermined temperature, the process proceeds to the step S4, and the heat pump-type heating device 1 activates the compressor 10 and a heating operation starts. At this stage, the compressor 10 upon activation is under the rotation number reduction control.

Under the rotation number reduction control in the step S4, the driving frequency of the compressor 10 increases stepwise toward a driving frequency which is based on the load of the hot water supply heat exchanger 16A or the heating-purpose heat exchanger 16B, and the opening degree of the motor-operated valve 12 is controlled to be an opening degree which is based on the load of the hot water supply heat exchanger 16A or the heating-purpose heat exchanger 16B.

At this stage, the rotation number of the outdoor fan 13 is controlled to be in a stopped state irrespective of the outside temperature and the compressor frequency.

When in the step S2 the difference between the inflow water temperature of the hot water supply heat exchanger 16A or the heating-purpose heat exchanger 16B and the outside temperature is smaller than the predetermined temperature difference or in the step S3 the discharge temperature of the compressor 10 is higher than the predetermined temperature, the process proceeds to the step S7 and normal control of the compressor 10 upon activation is carried out.

Under the normal control in the step S7, the driving frequency of the compressor 10 increases stepwise toward the driving frequency which is based on the load of hot water supply heat exchanger 16A or the heating-purpose heat exchanger 16B, and the rotation number of the outdoor fan 13 is controlled to be at a rotation number which is based on the outside temperature and the compressor frequency.

After the rotation number reduction control starts in the step S4, whether the discharge temperature of the compressor 10 is higher than the condensation temperature of the hot water supply heat exchanger 16A or the heating-purpose heat exchanger 16B is determined in the step S5. In the step S4, when the first state is set, the refrigerant discharged from the compressor 10 flows into the first passage 24 via the four-pass switching valve 18. On this account, whether the discharge temperature of the compressor 10 is higher than the condensation temperature of the hot water supply heat exchanger 16A is determined. Meanwhile, when the second state is set, because the refrigerant discharged from the compressor 10 flows into the second passage 25 via the four-pass switching valve 18, whether the discharge temperature of the compressor 10 is higher than the condensation temperature of the heating-purpose heat exchanger 16B is determined.

When the discharge temperature of the compressor 10 is higher than the condensation temperature of the hot water supply heat exchanger 16A or the heating-purpose heat exchanger 16B in the step S5, the process proceeds to the step S6 and whether the outside temperature is higher than the outdoor heat-exchange temperature is determined. When the outside temperature is higher than the outdoor heat-exchange temperature in the step S6, the process proceeds to the step S7 and the normal control of the compressor 10 upon activation is carried out.

When the discharge temperature of the compressor 10 is lower than the condensation temperature of the hot water supply heat exchanger 16A or the heating-purpose heat exchanger 16B in the step S5, the rotation number reduction control in the step S4 is continued.

When the outside temperature is lower than the outdoor heat-exchange temperature in the step S6, the rotation number reduction control in the step S4 is continued.

[Characteristics of Heat Pump-Type Heating Device of Present Embodiment]

The heat pump-type heating device of the present embodiment has the following characteristics.

In the heat pump-type heating device 1 of the present invention, because the outdoor fan 13 is in the stopped state upon activation of the compressor 10 when the difference between the outside temperature and the inflow water temperature of the hot water supply heat exchanger 16A or the heating-purpose heat exchanger 16B is equal to or higher than the predetermined temperature difference, condensation of the refrigerant in the dome of the compressor is prevented. It is therefore possible to prevent the oil level in the compressor from being lowered upon activation of the compressor 10.

In the heat pump-type heating device 1 of the present invention, the rotation number reduction control is carried out only when the discharge temperature of the compressor 10 is equal to or lower than the predetermined temperature. It is therefore possible to prevent the outdoor fan 13 from being controlled to be in the stopped state when the refrigerant is not condensed in the dome of the compressor 10 upon activation of the compressor 10.

In the heat pump-type heating device 1 of the present invention, the rotation number reduction control can be terminated when the discharge temperature of the compressor 10 becomes equal to or higher than the condensation temperature of the hot water supply heat exchanger 16A or the heating-purpose heat exchanger 16B and the refrigerant is no longer condensed in the dome of the compressor 10.

In the heat pump-type heating device 1 of the present invention, the rotation number reduction control can be terminated when the temperature of the outdoor heat exchanger 11 becomes lower than the outside temperature and the refrigerant is no longer condensed in the dome of the compressor 10.

While the embodiment of the present invention has been described based on the figures, the scope of the invention is not limited to the above-described embodiment. The scope of the present invention is defined not by the above embodiment but by claims set forth below, and shall encompass the equivalents in the meaning of the claims and every modification within the scope of the claims.

While in the embodiment above the rotation number reduction control is carried out only when the discharge temperature of the compressor 10 is equal to or lower than the predetermined temperature, the rotation number reduction control may be carried out irrespective of the discharge temperature of the compressor 10. In the present invention, the rotation number reduction control may not be limited to the control of arranging the outdoor fan to be in the stopped state, and may be to arrange the rotation number to be smaller than the rotation number in the normal control (i.e., the rotation number based on the outside temperature and the compressor frequency).

In the embodiment above, the rotation number reduction control is terminated when the discharge temperature of the compressor 10 becomes higher than the condensation temperature of the hot water supply heat exchanger 16A or the heating-purpose heat exchanger 16B and the temperature of the outdoor heat exchanger 11 becomes lower than the outside temperature. However, the rotation number reduction control may be terminated in a different way.

In the embodiment above, the target-side heat exchanger is the hot water supply heat exchanger 16A or the heating-purpose heat exchanger 16B configured to heat hot water supplied to the hot water supply terminal or the heating terminal. Alternatively, the target-side heat exchanger may be an indoor heat exchanger provided in the room and the room air may be heated by a refrigerant in the indoor heat exchanger. In this case, in the present invention, the rotation number of the outdoor fan upon activation of the compressor when a difference between the temperature (fluid temperature) of the room air supplied to the indoor heat exchanger (target-side heat exchanger) and the outside temperature is equal to or larger than a predetermined temperature difference is smaller than the rotation number when the difference is smaller than the predetermined temperature difference.

INDUSTRIAL APPLICABILITY

The present invention makes it possible to prevent the oil level in the compressor from being lowered.

REFERENCE SIGNS LIST

1 heat pump-type heating device
10 compressor
11 outdoor heat exchanger (heat-source-side heat exchanger)
12 motor-operated valve
13 outdoor fan
16A hot water supply heat exchanger (target-side heat exchanger)
16B heating-purpose heat exchanger (target-side heat exchanger)

The invention claimed is:

1. A heat pump-type heating device comprising:
a refrigerant circuit in which a compressor, a heat-source-side heat exchanger, a motor-operated valve, and a target-side heat exchanger are provided;
an outdoor fan which is provided for the heat-source-side heat exchanger; and
a controller programmed to control the outdoor fan on the basis of signals obtained by temperature sensors respectively configured to measure a temperature of fluid supplied to the target-side heat exchanger from outside the device and an outside temperature,
wherein the target-side heat exchanger is capable of heating, by a refrigerant, the fluid supplied from outside the device, and
wherein the controller is programmed to carry out a rotation number reduction control on the outdoor fan when a difference between the temperature of the fluid supplied to the target-side heat exchanger and the outside temperature is equal to or larger than a predetermined temperature difference, a rotation number of the outdoor fan upon activation of the compressor being smaller than when the difference is smaller than the predetermined temperature difference under the rotation number reduction control.

2. The heat pump-type heating device according to claim 1, wherein the controller further obtains a signal from a temperature sensor configured to detect a discharge temperature of the compressor, and the controller is programmed to carry out the rotation number reduction control of reducing the rotation number of the outdoor fan upon activation of the compressor when the discharge temperature of the compressor is equal to or lower than a predetermined temperature.

3. The heat pump-type heating device according to claim 1, wherein the controller further obtains signals from temperature sensors respectively configured to detect a discharge temperature of the compressor and a condensation temperature of the target-side heat exchanger, and the controller is programmed to terminate the rotation number reduction control of reducing the rotation number of the outdoor fan upon activation of the compressor when the discharge temperature of the compressor is higher than the condensation temperature of the target-side heat exchanger.

4. The heat pump-type heating device according to claim 1, wherein the controller further obtains a signal from a temperature sensor configured to detect a temperature of the heat-source-side heat exchanger, and the controller is programmed to terminate the rotation number reduction control of reducing the rotation number of the outdoor fan upon activation of the compressor when the temperature of the heat-source-side heat exchanger is lower than the outside temperature.

* * * * *